United States Patent
Karanam et al.

(10) Patent No.: US 9,686,324 B2
(45) Date of Patent: Jun. 20, 2017

(54) SYSTEM AND METHOD FOR ESTABLISHING COMMUNICATION LINKS BETWEEN MOBILE DEVICES

(71) Applicant: PLUSRAY Innovations Private Limited, Bangalore (IN)

(72) Inventors: Sreenivas Karanam, Bangalore (IN); Naga Prakash Kaja, Bangalore (IN)

(73) Assignee: KIRUSA, INC., New Providence, NJ (US)

( * ) Notice: Subject to any disclaimer, the term of this patent is extended or adjusted under 35 U.S.C. 154(b) by 63 days.

(21) Appl. No.: 14/192,640

(22) Filed: Feb. 27, 2014

(65) Prior Publication Data
US 2014/0286200 A1    Sep. 25, 2014

(30) Foreign Application Priority Data

Mar. 25, 2013 (IN) .......................... 1273/CHE/2013

(51) Int. Cl.
| | |
|---|---|
| *H04W 88/06* | (2009.01) |
| *H04L 29/06* | (2006.01) |
| *H04W 76/02* | (2009.01) |
| *H04W 76/06* | (2009.01) |

(52) U.S. Cl.
CPC ........ *H04L 65/1069* (2013.01); *H04L 65/103* (2013.01); *H04W 76/026* (2013.01); *H04W 76/066* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,246,886 B1 * | 6/2001 | Oliva | H04W 99/00 455/426.1 |
| 7,711,366 B1 * | 5/2010 | O'Neil | H04W 36/30 370/331 |
| 7,737,896 B1 * | 6/2010 | Suri | H04W 48/16 343/702 |

(Continued)

FOREIGN PATENT DOCUMENTS

FI    EP 1701576 A1 *   9/2006  ......... H04B 7/18563

*Primary Examiner* — Hassan Phillips
*Assistant Examiner* — Ayanah George
(74) *Attorney, Agent, or Firm* — Ash Tankha; Lipton, Weinberger & Husick

(57) ABSTRACT

A method of establishing a communication link between a first mobile communication device and a second mobile communication device on a first network or a second network is provided. The method includes processing by a processor from the first mobile communication device, an indication to initiate a link to the second mobile communication device, initiating by the processor, (i) a first link from the first mobile communication device to the second mobile communication device through the first network, and (ii) a second link from the first mobile communication device to the second mobile communication device through the second network, receiving an indication on the first mobile communication device including a selection of the first link or the second link to obtain a selected link, and establishing by the processor, a communication link between the first mobile communication device and the second mobile communication device on the selected link.

13 Claims, 8 Drawing Sheets

(56) References Cited

U.S. PATENT DOCUMENTS

| | | | |
|---|---|---|---|
| 2005/0153733 A1* | 7/2005 | Park | H04W 88/06 455/552.1 |
| 2007/0072595 A1* | 3/2007 | Pi | H04M 1/72522 455/415 |
| 2007/0077932 A1* | 4/2007 | Pi | H04W 88/06 455/445 |

* cited by examiner

SYSTEM AND METHOD FOR ESTABLISHING COMMUNICATION LINKS BETWEEN MOBILE DEVICES

BACKGROUND

Technical Field

The embodiments herein generally relate to mobile devices, and, more particularly, to a system and method for establishing communication links between mobile devices.

Description of the Related Art

Presently, users have to maintain several sets of information to reach a particular mobile device depending on the type of call he/she wants to initiate. Service operators provide a broad range of service plans that include different voice/data plans in many ways to reduce cost on calls. Users of a mobile device can choose to call the other mobile using the typical voice call option provided by telecom carriers. This can be a voice call over a GSM network, a CDMA network, a 2G network, or a 3G network, etc. Further, a user also uses a voice over internet protocol (VoIP) to initiate a call to another user. The VoIP commonly refers to the communication protocols, technologies, methodologies, and transmission techniques involved in the delivery of voice communications and multimedia sessions over Internet Protocol (IP) networks, such as the Internet.

This is typically, achieved by installing applications on to the mobile device from where they can initiate VoIP calls across mobile devices by browsing contacts on their mobile device with a different graphical user interface to initiate and establish a VoIP call. However, this can be achieved when the user (e.g., a calling party) is aware of the other user (e.g., a called party) that he/she is online by checking at the other user's status. Any error or delay in the update of the "online status" of the user would result in the VOIP call not going through when the update leads to displaying incorrect status. On the other hand, mobile devices may have to continuously keep the data connection ON, to receive VoIP calls. This may lead to draining the battery, and resulting in poor performance of the mobile device.

Accordingly, there remains a need for establishing an effective and easy communication link across mobile communication devices with reduced call connectivity failure rates.

SUMMARY

In view of the foregoing, an embodiment herein provides a method of establishing a communication link between a first mobile communication device and a second mobile communication device on a first network or a second network. The method includes processing from the first mobile communication device, an indication to initiate a link to the second mobile communication device, initiating (i) a first link from the first mobile communication device to the second mobile communication device through the first network, and (ii) a second link from the first mobile communication device to the second mobile communication device through the second network, receiving an indication on the first mobile communication device comprising a selection of the first link or the second link to obtain a selected link, and establishing a communication link between the first mobile communication device and the second mobile communication device on the selected link.

The method further includes detecting, a third link from a third mobile communication device on the first mobile communication device, obtaining from a database of the first mobile communication device, a priority indicator specific to a contact information associated with the third mobile communication device, performing a comparison of the priority indicator specific to the third mobile communication device and a priority indicator specific to a contact information associated with the second mobile communication device, and triggering an action to be executed on the first mobile communication device based on the comparison.

The first link is initiated at a first interval, and the second link is initiated at a second interval. The first interval and the second interval are identical. The first interval and the second interval are different from each other. The first network is selected from a group that includes a GSM network, and a CDMA network. The second network includes a VoIP network.

The selection of the first link or the second link to obtain the selected link is based on at least one of a location associated with the second mobile communication device, and signal strength on the second mobile communication device specific to the location.

In another aspect, a method for establishing a communication link between a first mobile communication device and a second mobile communication device on a first network or a second network is provided. The method includes detecting, on the second mobile communication device, (i) a first link from the first mobile communication device to the second mobile communication device through the first network, and (ii) a second link from the first mobile communication device to the second mobile communication device through the second network, processing an indication to select at least one of the first link or the second link to obtain a selected link, and establishing a communication link between the first mobile communication device and the second mobile communication device on the selected link.

The method may further include detecting, a third link from a third mobile communication device on the second communication device, obtaining from a database of the second mobile communication device, a priority indicator specific to a contact information associated with the third mobile communication device, performing a comparison of the priority indicator specific to the third mobile communication device and a priority indicator specific to a contact information associated with the first mobile communication device, and triggering an action to be executed on the second mobile communication device based on the comparison.

In yet another aspect, a first mobile communication device for establishing a communication link between the first mobile communication device and a second mobile communication device on a first network or a second network is provided. The first mobile communication device includes a memory that stores instructions and a database. The database stores one or more contact information specific to one or more mobile communication devices, and one or more priority indicators. Each of the one or more priority indicators is specific to each of the one or more mobile communication devices. The first mobile communication device further includes a processor configured by the instructions, a processing module when executed by the processor, processes an indication to initiate a link to the second mobile communication device, a link initiating module when executed by the processor, initiates (i) a first link from the first mobile communication device to the second mobile communication device through the first network, and (ii) a second link from the first mobile communication device to the second mobile communication device through the second network, and a link establishment module when executed by the processor receives an indication on the first mobile communication device comprising a selection of the first link or the second link to obtain a selected link, and establishes a communication link between the first mobile communication device and the second mobile communication device on the selected link.

The first mobile communication device further includes a link detection module when executed by the processor detects a third link from a third mobile communication device on the first mobile communication device, a priority indicator obtaining module when executed by the processor obtains from the database of the first mobile communication device, a priority indicator specific to a contact information associated with the third mobile communication device, a comparison module when executed by the processor performs a comparison of the priority indicator specific to the third mobile communication device and a priority indicator specific to a contact information associated with the second mobile communication device stored in the database, and an action triggering module when executed by the processor, triggers an action to be executed on the first mobile communication device based on the comparison.

In a further aspect, a second mobile communication device for establishing a communication link between the first mobile communication device and the second mobile communication device on a first network or a second network is provided. The second mobile communication device includes a memory that stores instructions and a database. The database stores one or more contact information specific to one or more mobile communication devices, and one or more priority indicators. Each of the one or more priority indicators is specific to each of the one or more mobile communication devices. The second mobile communication device further includes a processor configured by the instructions, a link detection module when executed by the processor detects on the second mobile communication device, (i) a first link from the first mobile communication device to the second mobile communication device through the first network, and (ii) a second link from the first mobile communication device to the second mobile communication device through the second network. The processor processes an indication to select at least one of the first link or the second link to obtain a selected link. The second mobile communication device further includes a communication link establishment module when executed by the processor establishes a communication link between the first mobile communication device and the second mobile communication device on the selected link.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
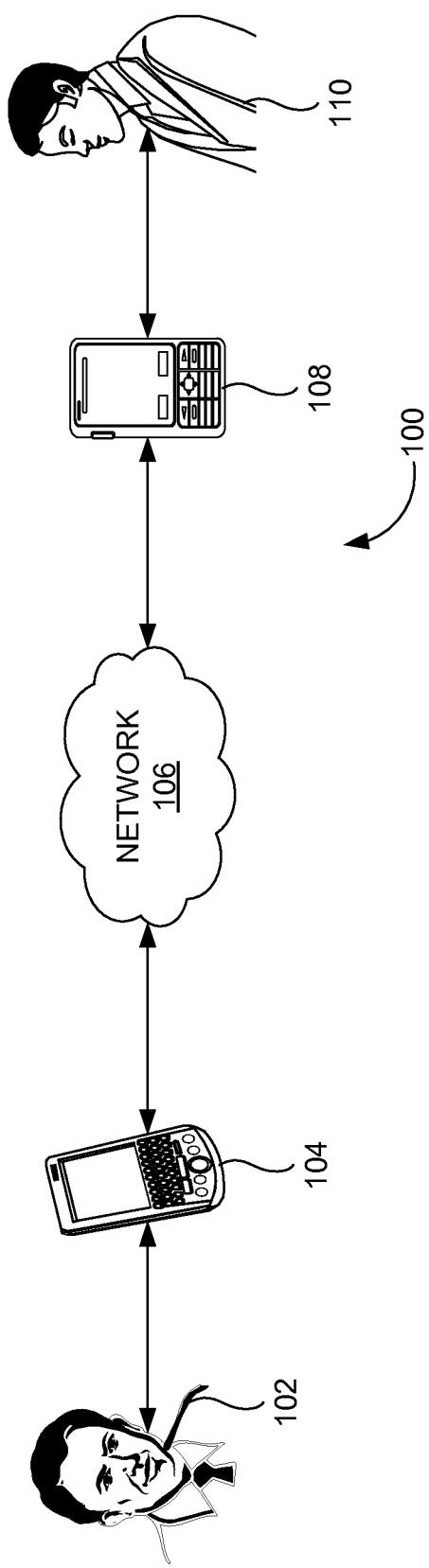
FIG. 1 illustrates a system view of a first user interacting with a first mobile communication device to establish a communication link via a network with a second mobile communication device associated with a second user according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for establishing an effective and easy communication link between mobile devices. The embodiments herein achieve this by providing a system and method for a establishing a communication link between a first mobile communication device and a second mobile communication device on a first network or a second network. The embodiments herein achieve this by processing from the first mobile communication device, an indication to initiate a link to the second mobile communication device, initiating (i) a first link from the first mobile communication device to the second mobile communication device through the first network, and (ii) a second link from the first mobile communication device to the second mobile communication device through the second network, receiving an indication on the first mobile communication device comprising a selection of the first link or the second link to obtain a selected link, and establishing a communication link between the first mobile communication device and the second mobile communication device on the selected link.

The selection of the first link or the second link to obtain a selected link is based on at least one of (i) a location of the second mobile communication, (ii) a signal strength associated with a service that is either subscribed by (by making a token amount to a service operator), or available for free to, the second mobile communication device, and (iii) user choice for reasons like cost benefit, etc.

When a third link is detecting from a third mobile communication device on the first mobile communication device while the communication link between the first mobile communication device and the second mobile communication device is currently (or still) active, the first mobile communication device performs a comparison of a priority indicator associated with contact information of a third user of the third mobile communication device and a priority indicator associated with contact information of a second user of the second mobile communication device, and triggers an action to be executed on the first mobile communication device based on the comparison. Referring now to the drawings, and more particularly to FIGS. 1 through 7, where similar reference characters denote corresponding features consistently throughout the figures, there are shown preferred embodiments.

FIG. 1 illustrates a system view of a first user 102 interacting with a first mobile communication device 104 to establish a communication link via a network 106 with a second mobile communication device 108 associated with a second user 110 according to an embodiment herein. The first user 102 provides an indication from the first mobile communication device 104 to initiate a link to the second mobile communication device 108. The first mobile communication device 104 initiates (i) a first link from the first mobile communication device 104 to the second mobile communication device 108 through a first network, and (ii) a second link from the first mobile communication device 104 to the second mobile communication device 108 through a second network. For instance, the first user 102 initiates a call to the second user 110. For example, when the first user 102 initiates the call from the first mobile communication device 104 to the second mobile communication device 108 in the first link (e.g., a first call mode such as a GSM call mode on a GSM network or a CDMA call mode on a CDMA network), the first mobile communication device 104 detects the first call mode and automatically triggers a second link (e.g., a second call mode such as a voice over internet protocol (VoIP) call mode on a VoIP network) in parallel, in example embodiment. The first mobile communication device 104 may prompt the first user 102 to select the second call mode. The second call mode may be automatically triggered or initiated after a period of interval. In other words, the first user 102 initiates a call to the second user 110 using a default application provided by a phone manufacturer or a service operator to initiate voice calls on a GSM or a 2G, etc. The first mobile communication device 104 detects this outgoing call and attempts to setup a call to the second mobile communication device 108 in an alternate communication mode (e.g., a VOIP call mode). By way of clarity and for better understanding of the embodiments described herein, initiating a call from a first mobile device to a second mobile device using multiple networks, and establishing a communication link between the first mobile devices and the second mobile device based on a selection of at least one link at the second mobile device is illustrated. It is to be understood that other communication modes (e.g., SMS, MMS, or any other communication modes/links), but not limited to initiating a call, may be established and implemented between mobile devices. It is to be understood that mobile device and mobile communication device are interchangeably used in the embodiments described herein.

The first link may be initiated from the first mobile communication device 104 at a first time interval T1, in one example embodiment. The second link may be initiated from the first mobile communication device 104 at a second time interval T2, in another example embodiment. The time intervals T1 and T2 are identical (e.g., T1=T2=10 h.30 m.00 s AM), in yet another embodiment. In other words, the first link is initiated at the first time interval (T1) 10 h.30 m.00 s AM, and the second link is initiated at the second time interval (T2) 10 h.30 m.00 s, in one example embodiment. The time intervals T1 and T2 are different from each other, in another example embodiment. For example, the first link is initiated at the first time interval (T1) 10 h.31 m.00 s AM, and the second link may be initiated at the second time interval (T2) 10 h.31 m.02 s. When the second mobile communication device 108 detects an incoming call in the first call mode (e.g., a GSM call mode), the second mobile communication device 108 also attempts to setup the incoming call in a second call mode (e.g., the VoIP call mode).

All the information required to reach the other mobile communication device in the second call mode, can be part of each mobile communication device memory or on each of the mobile communication devices, and may be acquired through various means such as accessing an external server or sending an SMS/MMS, etc. directly to other mobile communication device or sending the information through the available data network such as a GPRS network, a 3G network, a Wi-Fi network, or a LTE network, etc. directly to the other mobile communication device. Alternately when an outgoing call or an incoming call is detected in the first call mode, the both the mobile communication devices 104-108 may transmit the information to an external server and a second call mode can be established between the two mobile communication devices 104-108. The second call mode may be established by an application executed on the external server. The application may even terminate the first call mode and set up only the second call mode between the two mobile communication devices based on the prior preferences of the first user 102 or the second user 110.

The first mobile communication device 104 establishes the second call mode, when the first call mode is awaiting a response (e.g., answer or reject the call) at the second mobile communication device 108. The second user 110 is provided with two options to establish the call between the first mobile communication device 104 and the second mobile communication device 108. Based on an option selected by the second user 110 on the second mobile communication device 108, a communication link is established between the first mobile communication device 104 and the second mobile communication device 108. When the first network is selected (selection of the first call mode as the GSM call mode) on the second mobile communication device 108, the second network (e.g., the second call mode which is the VoIP call mode) is automatically terminated. In other words, when the first call mode (e.g., the GSM call mode) is selected, the second call mode (e.g., the VoIP call mode) is automatically terminated. In some cases, the second user 110 may be prompted/or requested (via a message displayed on the display screen of the second mobile communication device 108) to terminate the second call mode. Similarly, when the second call mode (e.g., the VoIP call mode) is selected, the first call mode (e.g., the GSM call mode) is automatically terminated. Likewise, the second user 110 may be prompted/or requested (via a message displayed on the display screen of the second mobile communication device 108) to terminate the first call mode when the second call mode is selected. In some cases, the second call mode option can be provided with a large delay or after the first call mode is terminated or no longer existing.

Figure 2:
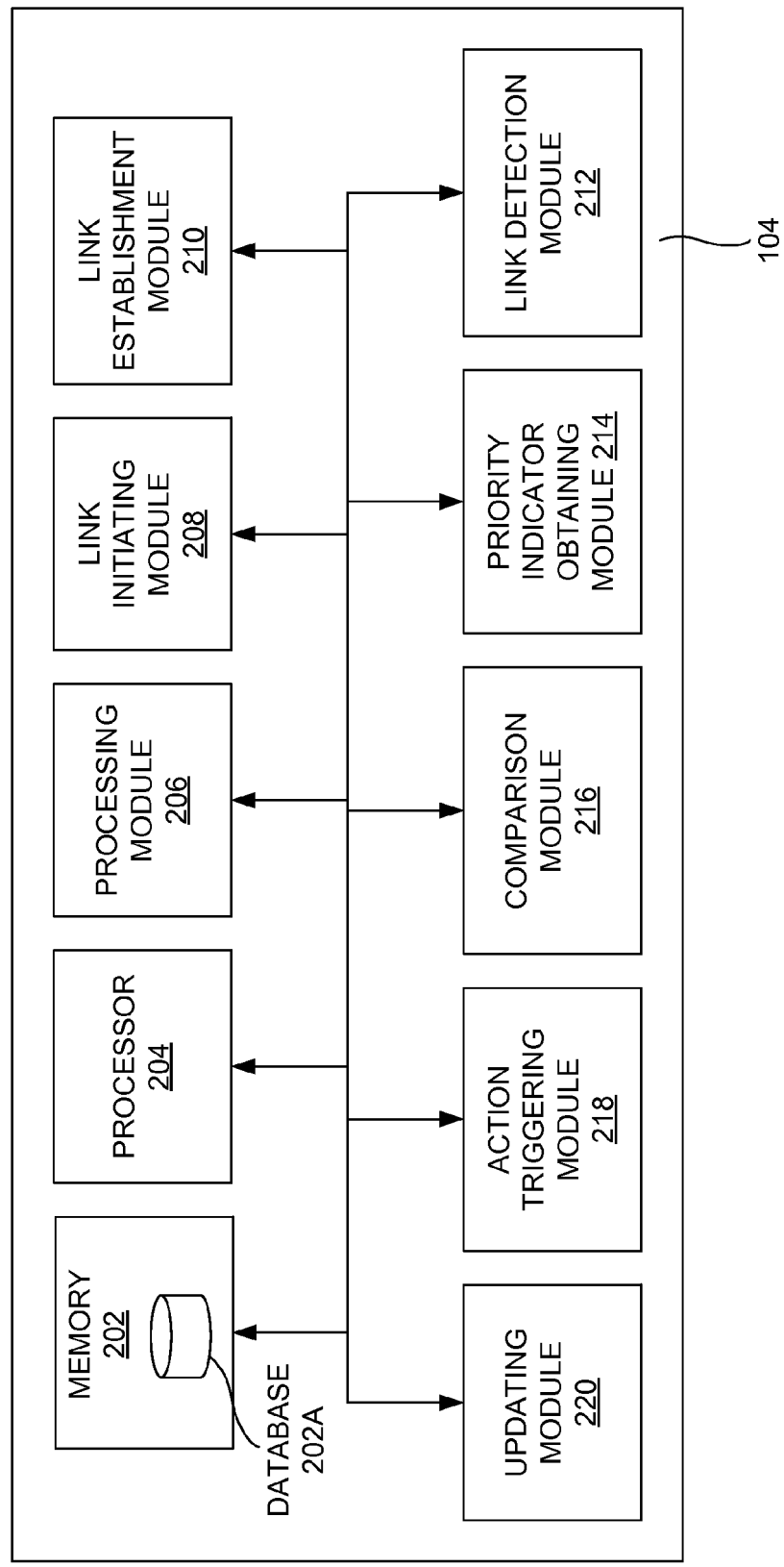
FIG. 2 illustrates an exploded view of the first mobile communication device of FIG. 1 according to an embodiment herein.

FIG. 2, with reference to FIG. 1, illustrates an exploded view of the first mobile communication device 104 of FIG. 1 according to an embodiment herein. The first mobile communication device 104 includes a memory 202 that stores includes instructions and a database 202A, a processor 204, a processing module 206, a link initiating module 208, a link establishment module 210, a link detection module 212, a priority indicator obtaining module 214, a comparison module 216, an action triggering module 218, and an updating module 220. The database 202A stores one or more contact information (e.g., phone numbers associated with one or more users), and one or more priority indicators associated with the one or more contact information. Each of the priority indicators is assigned to each of the contact information stored in the database 202A. Each of the priority indicators is pre-assigned or pre-associated to each of the contact information stored in the database 202A, in a preferred embodiment. The one or more contact information may also be stored in a memory 202, in one example embodiment. The first mobile communication device 104 may synchronize with one or more social media such as social networking portals (e.g., Facebook®, LinkedIn®, and/or Twitter®) and retrieve one or more contact information from the social networking portals and store the one or more contact information in the database 202A. The processor 204 is configured by the instructions to execute the processing module 206, the link initiating module 208, the link establishment module 210, the link detection module 212, the priority indicator obtaining module 214, the comparison module 216, the action triggering module 218, and the updating module 220.

The processing module 206 when executed by a processor 204 processes from the first mobile communication device 104, an indication to initiate a link to the second mobile communication device 108. The link initiating module 208 when executed by the processor 204 initiates (i) a first link from the first communication device 104 to the second mobile communication device 108 through the first network (e.g., a GSM network, or a CDMA network) and (ii) a second link from the first communication device 104 to the second mobile communication device 108 through the second network (e.g., a VoIP network). The indication to initiate the first link and the second link may be provided as an input by the first user 102, in one example embodiment. However, it is not necessary to receive the indication from the first user 102 to initiate the second link. In other words, the first mobile communication device 104 automatically initiates the second link.

After initiating the first link and the second link, the first mobile communication device 104 receives an indication that includes a selection of the first link or the second link to obtain a selected link. The indication is received from the second mobile communication device 108 (which is either selected by the second user 110 or automatically selected by the second mobile communication device 108), in one example embodiment. The indication is received from a service operator associated with the first mobile communication device 104, in another example embodiment. The indication is received from a service operator associated with the second mobile communication device 108, in yet another example embodiment. The indication is received from a third party service provider who is in communication with the service operator associated with the first mobile communication device 104 or the second mobile communication device 108, in a further example embodiment. The link establishment module 210 when executed by the processor 204 establishes a communication link between the first mobile communication device 104 and the second mobile communication device 108 on the selected link.

The link detection module 212 when executed by the processor 204 detects a third link from a third mobile communication device (not shown in FIG. 2) on the first mobile communication device 104 when the communication link between the first mobile communication device 104 and the second mobile communication device 108 is still active. For example, when the first user 102 and the second user 110 are on a call using the first mobile communication device 104 and the second mobile communication device 108, and a third user initiates a link (e.g., the third link) from the third mobile communication device to the first mobile communication device 104, the third link is detected by the link detection module 212. When the third link is detected on the first mobile communication device 104, contact information associated with the third user (or the third mobile communication device) is retrieved from the database 202A (or from an address book) and displayed on the display screen of the first mobile communication device 104.

The priority indicator obtaining module 214 when executed by the processor 204, obtains from the database 202A, a priority indicator specific to contact information of the third user associated with the third mobile communication device. It is to be understood that the priority indicator specific to the contact information associated with the third mobile communication device is pre-assigned (or pre-associated) and stored in the database 202A. The comparison module 216 when executed by the processor 204 performs a comparison of the priority indicator associated with contact information of the third user with a priority indicator associated with contact information of the second user 110. In other words, the comparison module 216 determines whether the priority indicator for the contact information of the second user 110 is higher or lower when compared to the priority indicator for the contact information of the third user. The action triggering module 218 triggers an action to be executed on the first mobile communication device 104 based on the comparison.

The action may include but not limited to (a) answering an incoming call associated with the third link, either by (i) disconnecting the communication link between the first mobile communication device 104 and the second mobile communication device 108, or (ii) holding the communication link between the first mobile communication device 104 and the second mobile communication device 108 until the third link is terminated once it is established, (b) displaying a location information of the third link (e.g., an incoming call), (c) routing the incoming call to a different mobile number, (d) vibrate the first mobile communication device 104 continuously, (e) recording the incoming call on (i) the first mobile communication device or (ii) a remote server, (f) transmitting an SMS/messages (e.g., not limited to: will call you later, and/or right now busy, etc.) to the second mobile communication device 108 or to the third mobile communication device, (g) disable certain functionalities of the first mobile communication device 104 such as barring incoming/outgoing calls/SMS/Emails, and/or (h) an action specific to the first mobile communication device 104. The first user 102 accepts/or answers the incoming call associated with the third link in any of available modes (e.g., (a) in a GSM mode or a CDMA mode, or (b) in a VoIP mode based on a service associated with the first mobile communication device 104), which may be based on one or more parameters such as, but not limited to, (i) location of the first mobile communication device 104, and/or (ii) signal strength of the service in use in the first mobile communication device 104, in one example embodiment. It is to be understood that the second user 110 and the third user may accept/or answer an incoming call during an existing call in a similar manner as the first user 102 as described above.

For example, when the priority indicator associated the third user is higher than the priority indicator associated with the second user 110 the first mobile communication device 104 prioritizes the third link over the communication link that is currently active and established between the first mobile communication device 104 and the second mobile communication device 108. In other words, the first mobile communication device 104 may (i) automatically disconnect (or prompt the first user 102 to disconnect the communication link that is currently active), (ii) hold the communication link between the first mobile communication device 104 and the second mobile communication device 108 until the third link is active and/or terminated, and/or (iii) perform any of the other action described above.

Likewise, the communication link remains active and established between the first mobile communication device 104 and the second mobile communication device 108, when the priority indicator associated the second user 110 is higher than the priority indicator associated with the third user. In such a scenario, the first mobile communication device 104 may (i) disconnecting the third link, or (ii) establish but hold the third link, until the communication link between the first mobile communication device 104 and the second mobile communication device 108 is terminated, (iii) routing incoming call (from the third user) to a different mobile number, (iv) vibrate the first mobile communication device 104 continuously, (e) recording the incoming call on (i) the first mobile communication device or (ii) a remote server and allow the third user to speak/talk, (f) transmitting an SMS/messages (e.g., not limited to: will call you later, and/or right now busy, etc.) to the third mobile communication device.

The updating module 220 when executed by the processor 204 dynamically updates (or modifies) the priority indicator associated with contact information of the second mobile communication device 108 and the third mobile communication device based on an activity (that includes one or more actions described above) or a pattern (e.g., user behavior). The activity and/or the pattern may include but not limited to a frequency of accepting or disconnecting incoming calls, a frequency of outgoing calls, a frequency of messaging, a frequency of recording the incoming calls, or any other such interactive sessions between the first mobile communication device 104, the second mobile communication device 108 and the third mobile communication device. It is to be understood that the first user 102 may update (or modify) the priority indicator associated with contact information of the second mobile communication device 108 and the third mobile communication device, at any point of time.

Although, FIG. 2 depicts an exploded view of the first mobile communication device 104, it is to be understood that the memory 202, the database 202A, the processor 204, the processing module 206, the link initiating module 208, the link establishment module 210, the link detection module 212, the priority indicator obtaining module 214, the comparison module 216, the action triggering module 218, and the updating module 220 are implemented in the second mobile communication device 108, the third mobile communication device, and in subsequent mobile communication devices for performing the methodology described herein. The processing module 206, the link initiating module 208, the link establishment module 210, the link detection module 212, the priority indicator obtaining module 214, the comparison module 216, the action triggering module 218, and the updating module 220 when executed by a processor of the second mobile communication device 108 perform the above methodology described herein.

The link detection module 212 when executed by the processor, detects on the second mobile communication device 108, (i) a first link from the first mobile communication device 104 to the second mobile communication device 108 through the first network, and (ii) a second link from the first mobile communication device 104 to the second mobile communication device 108 through the second network. The processor 204 processes an indication to select at least one of the first link or the second link to obtain a selected link. The link establishment module 210 when executed by the processor 204 establishes a communication link between the first mobile communication device 104 and the second mobile communication device 108 on the selected link. The link detection module 212 further detects a third link from the third mobile communication device on the second mobile communication device 108. The priority indicator obtaining module 214 when executed by the processor, obtains from the database 202A of the second mobile communication device 108, a priority indicator specific to contact information associated with the third mobile communication device of the third user. The comparison module 216 when executed by the processor on the second mobile communication device 108 performs a comparison of the priority indicator specific to a contact information (of the third user) associated with the third mobile communication device and a priority indicator specific to a contact information associated with the second mobile communication device (of the second user 110) stored in the database 202A. The action triggering module 218 when executed by the processor, triggers an action to be executed on the second mobile communication device 108 based on the comparison. Likewise, the updating module 220 updates (or modifies) the priority indicator associated with contact information of the first mobile communication device 104 and the third mobile communication device based on an activity (that includes one or more actions described above) or a pattern (e.g., user behavior as described above).

In one embodiment, the processing module 206, the link initiating module 208, the link establishment module 210, the link detection module 212, the priority indicator obtaining module 214, the comparison module 216, the action triggering module 218, and the updating module 220 are implemented as a logically self-contained part of a software program that when executed by the processor perform one or more functions as described above. In another embodiment, the processing module 206, the link initiating module 208, the link establishment module 210, the link detection module 212, the priority indicator obtaining module 214, the comparison module 216, the action triggering module 218, and the updating module 220 are implemented as a self-contained hardware component.

Each of the first mobile communication device 104, the second mobile communication device 108, and the third mobile communication device includes a client application, in one example embodiment. The client application includes the above modules 206-220, in another example embodiment. The client application may also include a database 202A, in yet another example embodiment. It is to be understood that when the client application is executed on any of the first mobile communication device 104, the second mobile communication device 108, and/or the third mobile communication device, the database 202A from the client application may automatically synchronize (or prompt a user to initiate synchronization process for) one or more contacts from an address book from corresponding mobile communication devices. When the client application is executed on each of the first mobile communication device 104, the second mobile communication device 108, and the third mobile communication device, the above modules 206-220 (or a sub-set of the above modules) are also executed by the processor 204 to perform the methodologies described herein. For example, during an ongoing call between the first mobile communication device 104 and the second mobile communication device 108, if there is no new call detected on either the first mobile communication device 104 and the second mobile communication device 108; the link detection module 212, the priority indicator obtaining module 214, the comparison module 216, the action triggering module 218, and the updating module 220 remain offline (or not necessarily be executed on the first mobile communication device 104 and/or the second mobile communication device 108), in one example embodiment.

Figure 3A:
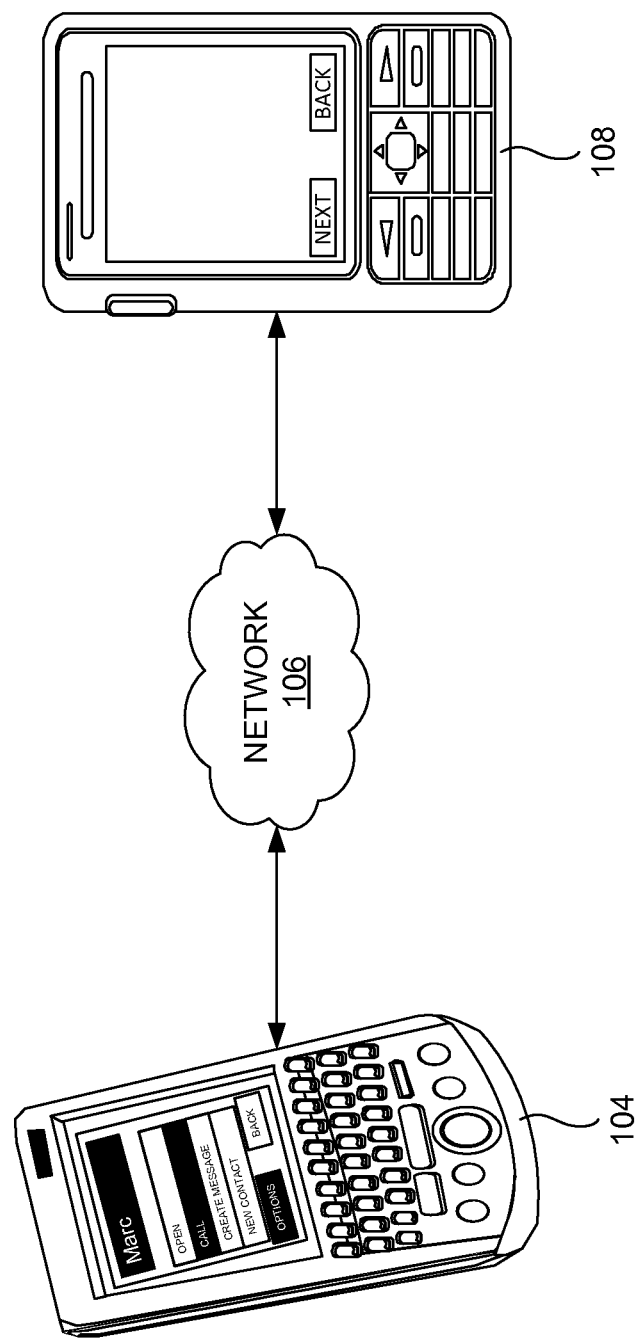
FIG. 3A is a user interface view of the first mobile communication device of FIG. 1 attempting to initiate a call with the second mobile communication device of FIG. 1 via the network of FIG. 1 according to an embodiment herein.

FIG. 3A, with reference to FIG. 1, is a user interface view of the first mobile communication device 104 of FIG. 1 attempting to initiate a call with the second mobile communication device 108 of FIG. 1 via the network 106 of FIG. 1 according to an embodiment herein. As shown in FIG. 3A, when the call is initiated at the first mobile communication device 104 in a first call mode (e.g., call mode 1), a second call mode (e.g., call mode 2) is trigged in parallel, or triggered after a period of interval for the same call.

Figure 3B:
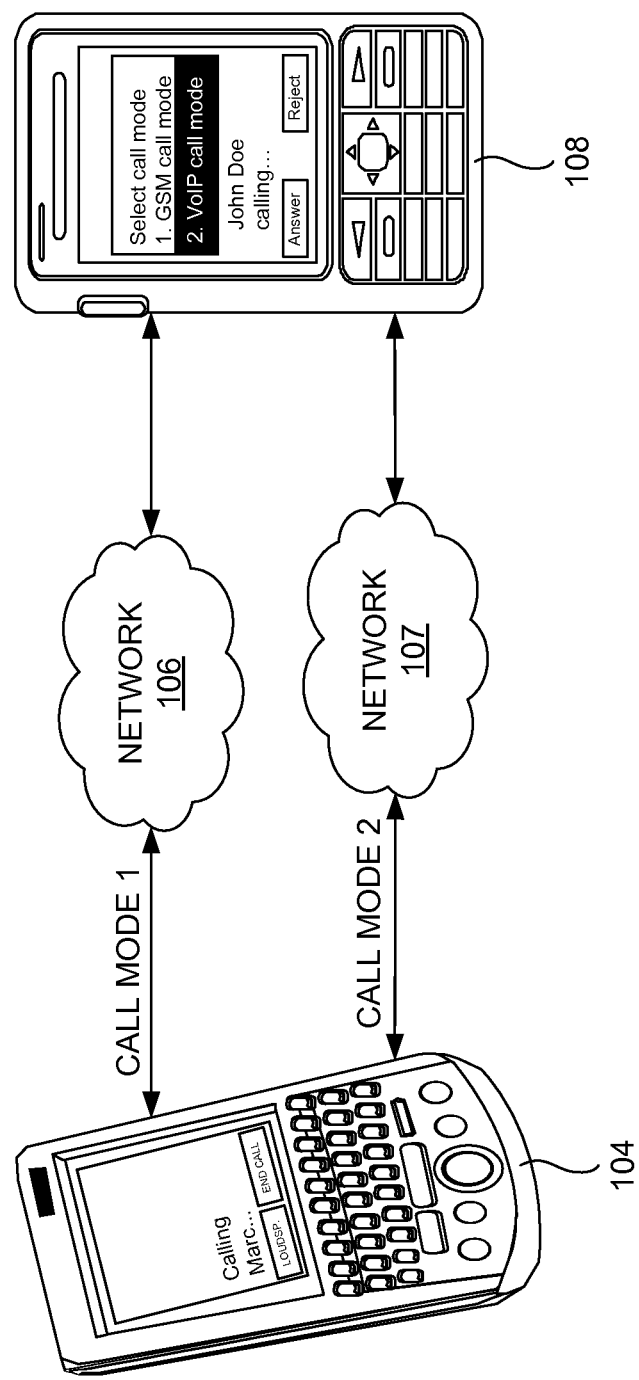
FIG. 3B is a user interface view illustrating a link selection at the second mobile communication device of FIG. 1 by the second user of FIG. 1 for the call initiated by the first user of FIG. 1 from the first mobile communication device of FIG. 1 according to an embodiment herein.

FIG. 3B, with reference to FIG. 1 through FIG. 3A, is a user interface view illustrating a link selection at the second mobile communication device 108 of FIG. 1 by the second user 110 of FIG. 1 for the call initiated by the first user 102 of FIG. 1 from the first mobile communication device 104 of FIG. 1 according to an embodiment herein. When the call is initiated from the first mobile communication device 104 in the first link (e.g., the first call mode), the second link (e.g., the second call mode) is triggered through a second network (e.g., a network 107). In one embodiment, the first link (or the first call mode) may be in a GSM network or a CDMA network (e.g., the network 106), and the second link (or the second call mode) may be in a VoIP network (e.g., the network 107). In another embodiment, the first call mode may be in a VoIP network, and the second call mode may be in a GSM network, in one example embodiment. Likewise, the first call mode may be in a VoIP network, and the second call mode may be in a CDMA network, in another example embodiment.

The second user 110 may select the VoIP call mode as the call mode to establish the call with the first user 102 based on the location of the second mobile communication device 108. For example, when the second user 110 is at office premises, or at home premises where a Wi-Fi network is available, the second user 110 may select the VoIP call mode. When the second user 110 is outside of the (i) home premises, or (ii) office premises, the second user 110 may select the call mode based on other networks available in that premises. The second user 110 may select the VoIP call mode when he/she is travelling. During travelling, the call mode selection may be based on the strength of the signal associated with (i) a service operator network (e.g., a GSM network, or a voice data plan such as 2G, 3G, LTE, Wi-Fi, etc.) or (ii) any other cost effective option, etc.

Similarly, the first user 102 may also select an appropriate call mode when he/she receives an incoming call on the first mobile communication device 104 from the second mobile communication device 108 initiated by the second user 110. When the second user 110 selects the GSM call mode to attend the incoming call initiated from the first mobile communication device 104 by the first user 102, the VoIP call mode (or corresponding client application or service) in both first mobile communication device 104 and the second mobile communication device 108 remain offline (or inactive/temporarily deactivated). Similarly, when the first user 102 selects the GSM call mode to attend an incoming call initiated from the second mobile communication device 108 by the second user 110, the VoIP call mode (or corresponding client application or service) in both the first mobile communication device 104 and the second mobile communication device 108 remain offline (or inactive/temporarily deactivated).

Figure 4:
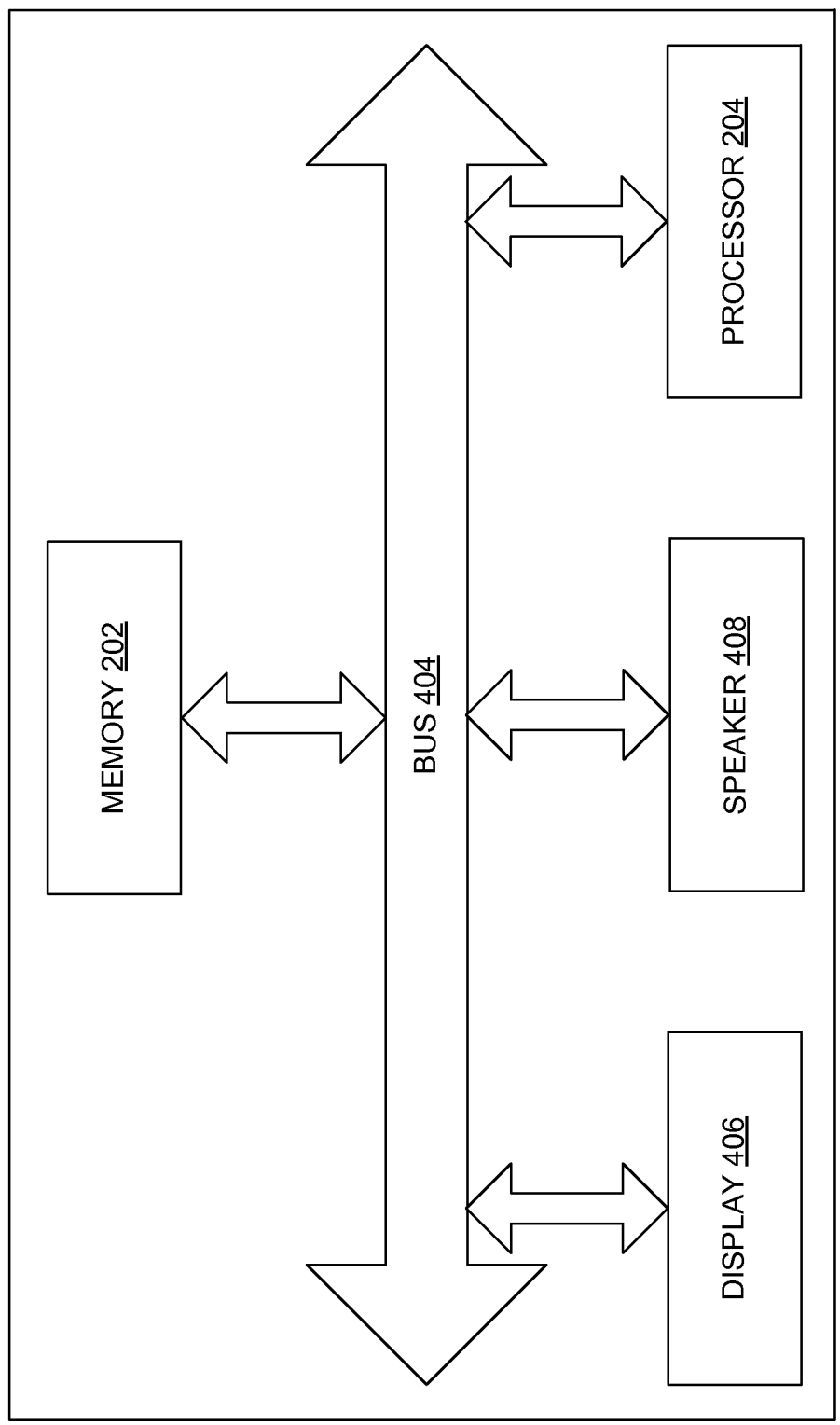
FIG. 4 illustrates a schematic diagram of a mobile communication device used in accordance with the embodiments herein.

FIG. 4, with reference to FIGS. 1 through 3B, illustrates a schematic diagram of a mobile communication device having the memory 202 having a set of instructions, a bus 404, a display 406, a speaker 408, and the processor 204 capable of processing the set of instructions to perform any one or more of the methodologies, according to an embodiment herein. The mobile communication device is the first mobile communication device 104, the second mobile communication device 108 and/or the third mobile communication device. The processor 204 may also enable digital content to be consumed in the form of video for output via one or more displays 406 or audio for output via speaker and/or earphones 408. The processor 204 may also carry out the methods described herein and in accordance with the embodiments herein.

Digital content may also be stored in the memory 202 for future processing or consumption. The memory 202 may also store program specific information and/or service information (PSI/SI), including information about digital content (e.g., the detected information bits) available in the future or stored from the past. A user (e.g., the first user 102, the second user 110, and/or the third user) of the mobile communication device may view this stored information on the display 406 and select an item of for viewing, listening, or other uses via input, which may take the form of keypad, scroll, or other input device(s) or combinations thereof. When digital content is selected, the processor 204 may pass information. The content and PSI/SI may be passed among functions within the mobile communication device using the bus 404.

The embodiments herein can include both hardware and software elements. The embodiments that are implemented in software include but are not limited to, firmware, resident software, microcode, etc. For example, the microcontroller can be configured to run software either stored locally or stored and run from a remote site.

In this regard, the software elements can be stored in the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium, fixed or removable.

Input/output (I/O) devices (including but not limited to keyboards, displays, pointing devices, etc.) can be coupled to the system either directly or through intervening I/O controllers, wired or wireless. Network adapters may also be coupled to the system to enable the data processing system to become coupled to other data processing systems or remote printers or storage devices through intervening private or public networks.

Figure 5:
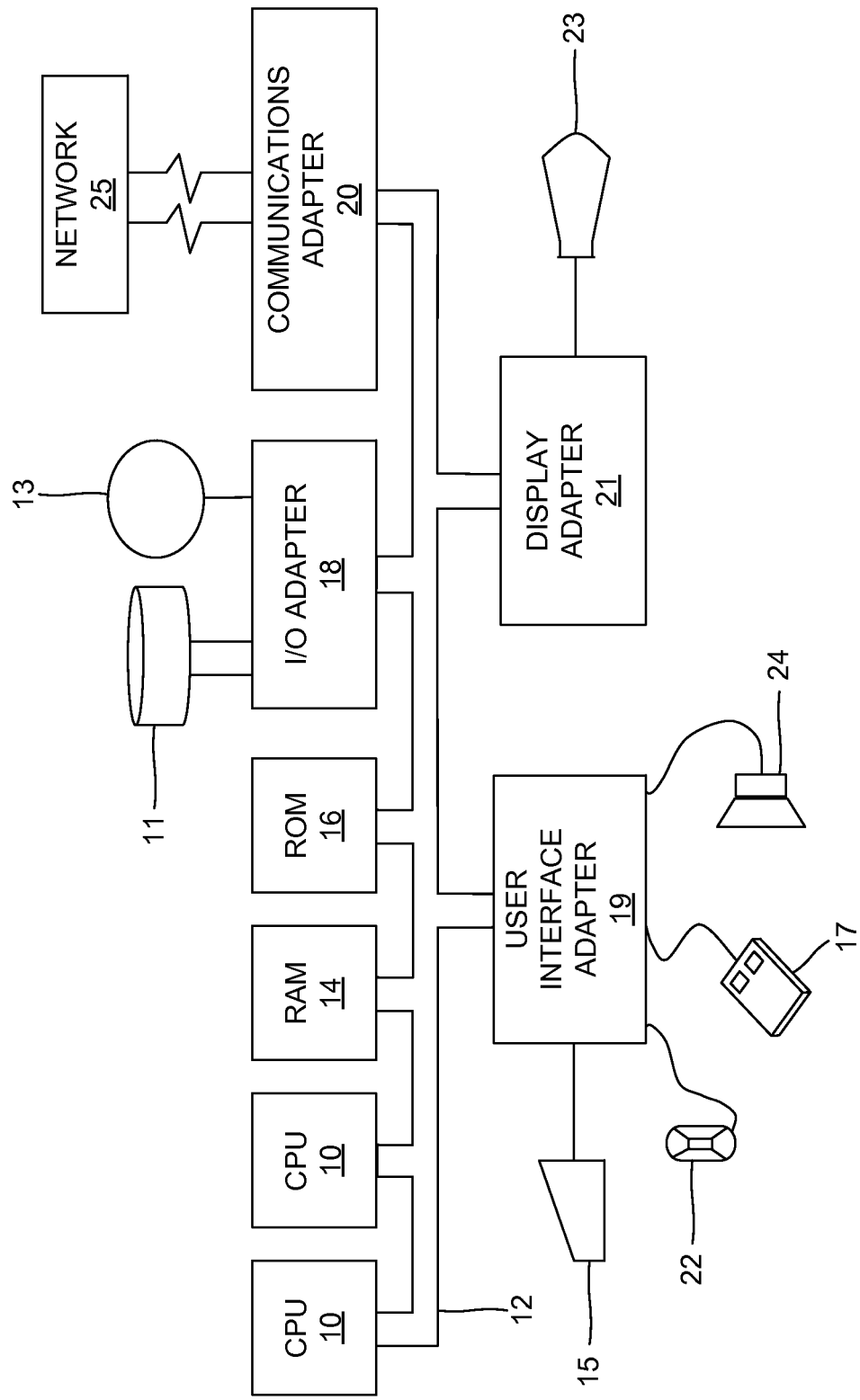
FIG. 5 a computer system used in accordance with the embodiments herein.

A representative hardware environment for practicing the software embodiments either locally or remotely is depicted in FIG. 5. This schematic drawing illustrates a hardware configuration of an information handling/computer system (or an external server) in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices 11, 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 6:
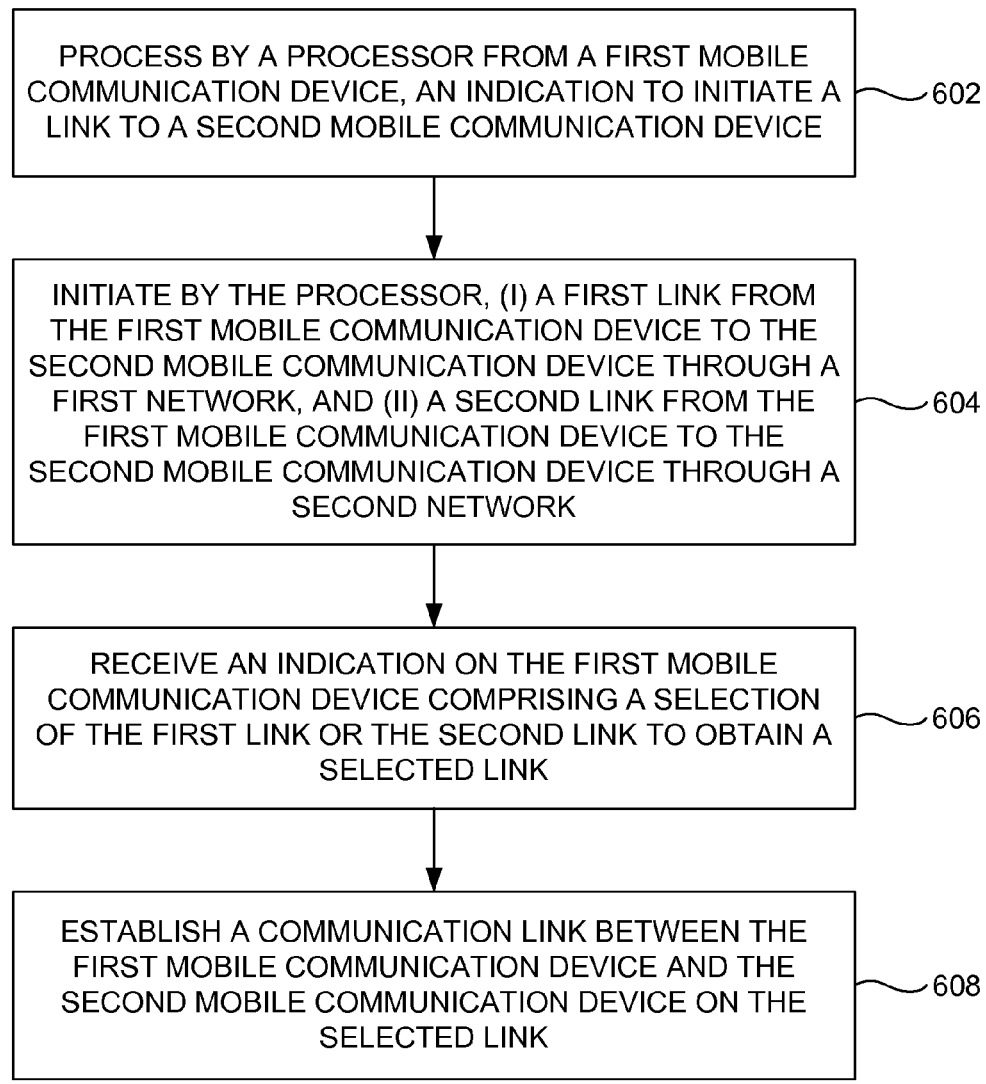
FIG. 6 is a flow diagram illustrating a method of establishing a communication link between the first mobile communication device of FIG. 1 and the second mobile communication device of FIG. 1 on the first network of FIG. 3B or the second network of FIG. 3B according to an embodiment herein.

FIG. 6, with reference to FIGS. 1 through 5, is a flow diagram illustrating a method of establishing a communication link between the first mobile communication device 104 of FIG. 1 and the second mobile communication device 108 of FIG. 1 on the first network 106 of FIG. 3B or the second network 107 of FIG. 3B according to an embodiment herein. In step 602, an indication to initiate a link from the first mobile communication device 104 to the second mobile communication device 108 is processed (e.g., using the processing module 206 of FIG. 2) from the first mobile communication device 104. In step 604, (i) a first link is initiated (e.g., using the link initiating module 208 of FIG. 2) from the first mobile communication device 104 to the second mobile communication device 108 through the first network 106, and (ii) a second link is initiated (e.g., using the link initiating module 208 of FIG. 2) from the first mobile communication device 104 to the second mobile communication device 108 through the second network 107. In step 606, an indication that includes a selection of the first link or the second link to obtain a selected link is received (e.g., by the processor 204 of FIG. 2) on the first mobile communication device 104. In step 608, a communication link is established (e.g., using the link establishment module 210 of FIG. 2) between the first mobile communication device 104 and the second mobile communication device 108 on the selected link.

A third link from a third mobile communication device may be detected on the first mobile communication device 104. A priority indicator specific to contact information associated with the third mobile communication device may obtained (e.g., using the priority indicator obtaining module 214 of FIG. 2) from the database 202A of the first mobile communication device 104. A comparison of the priority indicator specific to the third mobile communication device and a priority indicator specific to a contact information associated with the second mobile communication device is performed (e.g., using the comparison module 216 of FIG. 2). An action to be executed on the first mobile communication device 104 is triggered (e.g., using the action triggering module 218 of FIG. 2) based on the comparison.

The first link is initiated at a first interval, and the second link is initiated at a second interval, in one example embodiment. The first interval and the second interval are identical. The first interval and the second interval are different from each other. The first network is selected from a group that includes a GSM network, and a CDMA network. The second network includes a VoIP network.

The selection of the first link or the second link to obtain the selected link may be based on at least one of a location (e.g., at home, at office, or any hotspot) associated with the second mobile communication device 108, and signal strength on the second mobile communication device 108 specific to the location.

Figure 7:
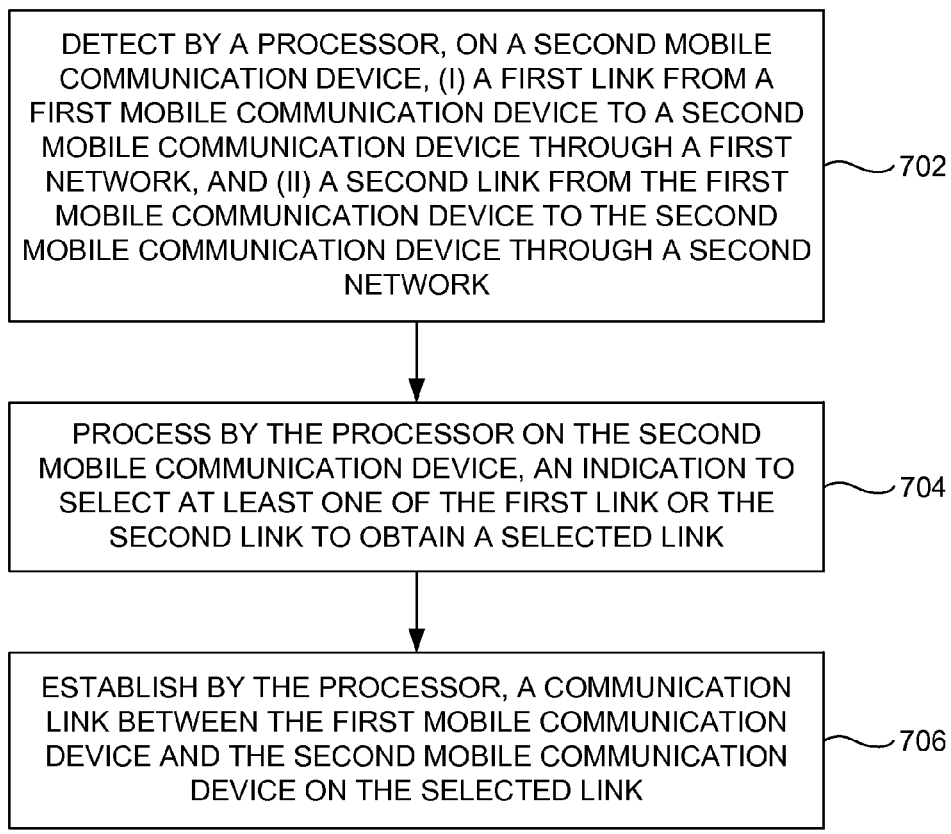
FIG. 7 is a flow diagram illustrating a method of establishing a communication link between the first mobile communication device of FIG. 1 and the second mobile communication device of FIG. 1 on the first network of FIG. 3B or the second network of FIG. 3B according to an embodiment herein.

FIG. 7, with reference to FIGS. 1 through 6, is a flow diagram illustrating a method of establishing a communication link between the first mobile communication device 104 of FIG. 1 and the second mobile communication device 108 of FIG. 1 on the first network 106 of FIG. 3B or the second network 107 of FIG. 3B according to an embodiment herein. In step 702, (i) a first link from the first mobile communication device to the second mobile communication device through the first network detecting, and (ii) a second link from the first mobile communication device to the second mobile communication device through the second network are detected on the second mobile communication device. In step 704, an indication to select at least one of the first link or the second link is processed to obtain a selected link. In step 706, a communication link is established between the first mobile communication device and the second mobile communication device on the selected link.

A third link from a third mobile communication device may be detected on the second communication device 108. A priority indicator specific to contact information associated with the third mobile communication device is obtained from a database of the second mobile communication device 108. A comparison of the priority indicator specific to the third mobile communication device and a priority indicator specific to a contact information associated with the first mobile communication device 104 is performed. An action to be executed on the second mobile communication device is triggered based on the comparison.

The illustrated embodiments above allow the second user to select a call mode for an incoming call. Further, the same call mode is set at the first mobile communication device 104 that has been selected by the second user 110 at the second mobile communication device 108 and establishes a call. The illustrated embodiments may be implemented in other mobile devices such as a personal computer, a laptop, a tablet PC, and/or smartphones that are capable of communicating with each other to (i) initiate a first link call from the first user 102, from the first mobile communication device 104, (ii) trigger simultaneously a second link (or from any available links), in parallel, (iii) select a link from the first link or the second link at the second mobile communication device 108 to obtain a selected link, (iv) set the same selected link at the first mobile communication device 104, (v) establish an effective communication link between the first mobile communication device 104 and the second mobile communication device 108, (vi) trigger an action to be executed on the mobile communication device specific to (i) an existing call or (ii) incoming calls detected during the existing link (e.g., when an incoming call is detected when a user is already on a call with another user).

Thus, a user need not know multiple ways of initiating links (e.g., calls) for multiple call modes. The user can always initiate a first link (e.g., a first call mode) through a first network and the execution required to setup the second link (e.g., a second call mode) through a second network is performed by the mobile device. The user may optionally respond (e.g., a YES or a NO) from a graphical user interface to set up the second call mode.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the present disclosure.

What is claimed is:

1. A method of establishing a call between a first mobile communication device and a second mobile communication device on a first network or a second network, the method comprising:
    processing, by a processor in the first mobile communication device, an indication from a first user of the first mobile communication device to initiate the call to a second user of the second mobile communication device;
    initiating, by the processor in the first mobile communication device, a first link to the second mobile communication device through the first network, wherein the first network is selected based on a choice made by the first user;
    automatically initiating, by the processor in the first mobile communication device, a second link to the second mobile communication device through the second network, wherein the second network is automatically selected by a processing module in the first mobile communication device;
    presenting, by the processor in the first mobile communication device, through a user interface of the first mobile communication device, options to the first user to select either the first link or the second link for the establishment of the call between the first mobile communication device and the second mobile communication device;
    receiving, by the processor in the first mobile communication device, through the user interface of the first mobile communication device, from the first user of the first mobile communication device a selection of one of the first link or the second link for the establishment of the call; and
    establishing, by the processor in the first mobile communication device, a call between the first mobile communication device and the second mobile communication device, based on the selected link.

2. The method of claim 1, further comprising detecting, by the processor in the first mobile communication device, a third link from a third mobile communication device on the first mobile communication device.

3. The method of claim 2, further comprising:
    obtaining, by the processor in the first mobile communication device, from a database of the first mobile communication device, a priority indicator specific to a contact information associated with the third mobile communication device;
    performing, by the processor in the first mobile communication device, a comparison of the priority indicator specific to the third mobile communication device and a priority indicator specific to a contact information associated with the second mobile communication device; and
    triggering, by the processor in the first mobile communication device, an action to be executed on the first mobile communication device, based on the comparison.

4. The method of claim 1, wherein the first network is selected from a group comprising a GSM network, and a CDMA network.

5. The method of claim 1, wherein the second network comprises a VoIP network.

6. The method of claim 1, wherein the selection of the first link or the second link to obtain the selected link is based on at least one of a location associated with the second mobile communication device, and signal strength on the second mobile communication device specific to the location.

7. A method for establishing a call between a first mobile communication device and a second mobile communication device on a first network or a second network, the method comprising:
    detecting, by a processor in the second mobile communication device, (i) a first link from the first mobile communication device to the second mobile communication device through the first network, and (ii) a second link from the first mobile communication device to the second mobile communication device through the second network that is distinct from the first network, wherein the first network for the first link is selected based on a choice made by a first user of the first mobile communication device, and wherein the second network for the second link is automatically selected by a processing module in the first mobile communication device;
    presenting, by the processor in the second mobile communication device, through a user interface of the second mobile communication device, options to a second user of the second mobile communication device to select either the first link or the second link for the establishment of the call between the first mobile communication device and the second mobile communication device;
    receiving, by the processor in the second mobile communication device, from the second user of the second mobile communication device, a selection of one of the first link or the second link for the establishment of the call to a second user of the second mobile communication device; and
    establishing by the processor, a call between the first mobile communication device and the second mobile communication device based on the selected link.

8. The method of claim 7, further comprising detecting, by the processor in the second mobile communication device, a third link from the first mobile communication device to a third mobile communication device.

9. The method of claim 8, further comprising:
- obtaining, by the processor in the second mobile communication device, from a database of the second mobile communication device, a priority indicator specific to a contact information associated with the third mobile communication device;
- performing, by the processor in the second mobile communication device, a comparison of the priority indicator specific to the third mobile communication device and a priority indicator specific to a contact information associated with the first mobile communication device; and
- triggering, by the processor in the second mobile communication device, an action to be executed on the second mobile communication device, based on the comparison.

10. A first mobile communication device for establishing a call between the first mobile communication device and a second mobile communication device on a first network or a second network, the first mobile communication device comprising:
- a memory that stores instructions and a database, wherein the database stores a plurality of contact information specific to a plurality of mobile communication devices, and a plurality of priority indicators, and wherein each of the plurality of priority indicators is specific to each of the plurality of mobile communication devices;
- a processor configured by the instructions;
- a processing module when executed by the processor, processes an indication from a first user of the first mobile communication device to initiate the call to a second user of the second mobile communication device;
- a link initiating module when executed by the processor, initiates a first link to the second mobile communication device through the first network, wherein the first network is selected based on a choice made by the first user;
- said link initiating module when executed by the processor, further automatically initiates a second link to the second mobile communication device through the second network, wherein the second network is automatically selected by the processing module in the first mobile communication device;
- a user interface of the first mobile communication device for presenting options to the first user of the first mobile communication device to select either the first link or the second link for the establishment of the call between the first user of the first mobile communication device and the second user of the second mobile communication device; and
- a link establishment module when executed by the processor, receives from the first user of the first mobile communication device, through the user interface of the first mobile communication device, a selection of the first link or the second link, and establishes a call between the first user of the first mobile communication device and the second user of the second mobile communication device based on the selected link.

11. The first mobile communication device of claim 10, further comprising a link detection module when executed by the processor, detects a third link from the first mobile communication device to a third mobile communication device on the first mobile communication device.

12. The first mobile communication device of claim 11, further comprising:
- a priority indicator obtaining module when executed by the processor, obtains from the database of the first mobile communication device, a priority indicator specific to a contact information associated with the third mobile communication device;
- a comparison module when executed by the processor performs a comparison of the priority indicator specific to the third mobile communication device and a priority indicator specific to a contact information associated with the second mobile communication device stored in the database; and
- an action triggering module when executed by the processor, triggers an action to be executed on the first mobile communication device based on the comparison.

13. A second mobile communication device for establishing a call between the first mobile communication device and the second mobile communication device on a first network or a second network, the second mobile communication device comprising:
- a memory in the second mobile communication device that stores instructions, a database in the second mobile communication device, wherein the database in the second mobile communication device stores a plurality of contact information specific to a plurality of mobile communication devices, and a plurality of priority indicators in the second mobile communication device, wherein each of the plurality of priority indicators is specific to each of the plurality of mobile communication devices; and
- a processor in the second mobile communication device configured by the instructions;
- a link detection module when executed by the processor in the second mobile communication device, detects on the second mobile communication device, (i) a first link from the first mobile communication device to the second mobile communication device through the first network, and (ii) a second link from the first mobile communication device to the second mobile communication device through the second network that is distinct from the first network, wherein the first network for the first link is selected based on a choice made by a first user of the first mobile communication device, and wherein the second network for the second link is automatically selected by a processing module in the first mobile communication device;
- a user interface of the second mobile communication device for presenting options to a second user of the second mobile communication device to select either the first link or the second link to receive the call from the first user of the first mobile communication device, wherein the processor in the second mobile communication device processes the selection received from the second user of the second mobile communication device through; and
- a communication link establishment module when executed by the processor establishes a call between the first mobile communication device and the second mobile communication device based on the selected link.

* * * * *